Patented Jan. 24, 1933

1,894,969

UNITED STATES PATENT OFFICE

CYRUS B. WOOD, OF TAKOMA PARK, DISTRICT OF COLUMBIA

DISINFECTANT OF WATER

No Drawing.    Application filed October 16, 1931.    Serial No. 569,272.

(GRANTED UNDER THE ACT OF MARCH 3, 1883, AS AMENDED APRIL 30, 1928; 370 O. G. 757)

This invention described herein may be manufactured and used by or for the Government for governmental purposes without the payment to me of any royalty thereon.

This invention relates to a method for the disinfection of water and to novel compositions for disinfecting water.

It has hitherto been found by the applicant that the chloro-imide of succinic acid, also known as succinchlorimide, is an efficient and advantageous disinfectant for drinking water.

This compound is represented by the following structural formula:

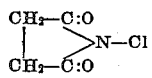

The object of the present invention is to more effectively utilize the disinfecting properties of succinchlorimide.

A further object is to provide this compound in a form convenient for use in disinfecting drinking water.

Further objects will be apparent from the following description of the invention.

Broadly the invention comprises the disinfection of water by contacting it with a composition of matter containing succinchlorimide and at least one other auxiliary compound advantageously in an integrated form, preferably in the shape of rods, sticks, buttons, and similar convenient shapes. The invention also comprises within its scope the novel compositions and articles of manufacture.

The new composition and articles of manufacture may be made by melting together, either successively or by mixing in the molten state succinchlorimide and one or more other compounds. The fused or melted mixture is then cast into molds of the desired shapes, from which the finished articles are removed after solidification.

Succinchlorimide melts at about 148° to 149° C. and it has been found that it can be melted repeatedly without apparent change provided it is not heated above 170° C. It is therefore desirable to choose as the auxiliary component or compounds of the new composition compounds which can be melted in admixture with succinchlorimide at a temperature not substantially higher than 170° C.

It is also desirable that the auxiliary compound or compounds should have the following properties:

(a) No reaction, or negligible reaction, with the air with which they may come in contact; in other words, they must not be noticeably hygroscopic, not readily oxidized, nor react in any other way with the gases of the atmosphere.

(b) No odor, or negligible odor of not unpleasant character.

(c) Very low toxicity to the human system.

(d) No reaction, while melted or on cooling, of chemical nature with the compound succinchlorimide.

(e) Ready solubility in water, with or without chemical reaction with water.

(f) On cooling after fusion and mixing with fused succinchlorimide, the resulting solid mass must be of satisfactory firmness and hardness to maintain itself, that is, it must not be soft and jelly-like.

(g) Resulting fused and cooled sticks, rods, buttons, or other shapes must be quite permanent on long exposure to the air; they should not become brittle or extremely hard on ageing.

Compounds of succinic acid have been found to be particularly desirable for use as auxiliary components in the compositions of the present invention. Of special value are succinic anhydride, melting at 119° to 120° C., and succinimide, melting at 123°–125° C. Either of these compounds may be advantageously mixed with succinchlorimide in amounts ranging from 30 to 70% of the total composition.

The following substances also have been found to give practically the same kind of mixture or fusion as compounds of succinic acid when mixed in various proportions with succinchlorimide, the resulting mixtures having a firm and not too brittle consistency:

Benzoic acid—$C_6H_5CO_2H$
Phthalic anhydride—$C_6H_4:(CO)_2:O(1,2)$
Benzoylsulfimide—$C_6H_4:(CO)(SO_2):NH(1,2)$
Trichloroacetamide—$CCl_3CONH_2$
Benzene sulfonamide—$C_6H_5SO_2NH_2$
Diethylbarbituric acid—$CO:(NH.CO)_2:C(C_2H_5)_2$ In general, organic acid compounds (which term comprises organic carboxylic acids, and their anhydrides, amides, imides and substitution products thereof) are advantageously used as auxiliary components in the compositions of the invention, and while I have enumerated for the purpose of illustrating the invention several such compounds, both of the aliphatic and aromatic types, it is to be understood that my invention is not limited to the compounds particularly enumerated, but on the contrary it will be apparent from the examples described that in general organic acid compounds having melting points within the above range are included in the scope of the invention.

In the application of the disinfecting agents of the present invention to the disinfection of water the pieces made as described above may conveniently be added to a moderately large quantity of water, for example in a Lyster water bag (about 36 gallons) or in a cask, barrel, hogshead, or similar vessel. When a piece of disinfectant made in accordance with the present invention is added to such a quantity of water the disease producing organisms contained therein will be found to have been nearly or completely rendered unviable and innocuous within a comparatively short space of time, for example in from 5 to 10 minutes.

This application is a continuation-in-part of my application Serial No. 429,448 filed Feb. 18, 1930.

Having disclosed my invention, what I claim as new and useful is:

1. A solidified composition of matter for disinfecting water resulting from cooling a molten mixture of succinchlorimide and at least one normally solid organic acid compound formed into solid integrated bodies.

2. A solidified composition of matter for disinfecting water resulting from cooling a molten mixture of succinchlorimide and at least one normally solid organic acid compound of the group including organic carboxylic acids and their amides, imides, anhydrides and substitution products thereof formed into solid integrated bodies.

3. A solidified composition of matter for disinfecting water resulting from cooling a molten mixture of succinchlorimide and at least one auxiliary substance of the group comprising benzoic acid, succinic anhydride and succinimide formed into solid integrated bodies.

4. A solidified composition of matter for disinfecting water resulting from cooling a molten mixture of succinchlorimide and benzoic acid formed into solid integrated bodies.

5. A solidified composition of matter for disinfecting water resulting from cooling a molten mixture of succinchlorimide and at least one auxiliary substance of the group comprising succinic anhydride and succinimide formed into solid integrated bodies.

6. A solidified composition of matter for disinfecting water resulting from cooling a molten mixture of succinchlorimide and at least one auxiliary substance of the group comprising succinic anhydride and succinimide in amounts from 30 to 70% of the total composition formed into solid integrated bodies.

CYRUS B. WOOD.